(12) United States Patent
Kancharla et al.

(10) Patent No.: US 8,457,874 B2
(45) Date of Patent: Jun. 4, 2013

(54) FUEL AND VEHICLE MONITORING METHODS AND SYSTEMS

(75) Inventors: Venugopal R. Kancharla, Scarborough, ME (US); Eric P. Maxham, Gray, ME (US); Samuele M. Rinaldi, Scarborough, ME (US)

(73) Assignee: Wex Inc., South Portland, ME (US)

( * ) Notice: Subject to any disclaimer, the term of this patent is extended or adjusted under 35 U.S.C. 154(b) by 271 days.

(21) Appl. No.: 12/818,247

(22) Filed: Jun. 18, 2010

(65) Prior Publication Data

US 2011/0313646 A1    Dec. 22, 2011

(51) Int. Cl.
G06F 19/00    (2011.01)

(52) U.S. Cl.
USPC .......................................... 701/123

(58) Field of Classification Search
USPC .......................................... 701/123
See application file for complete search history.

(56) References Cited

U.S. PATENT DOCUMENTS

| | | | |
|---|---|---|---|
| 6,092,021 A | 7/2000 | Ehlbeck et al. | |
| 7,419,094 B2 | 9/2008 | Grear et al. | |
| 7,650,210 B2 | 1/2010 | Breed | |
| 7,650,300 B2 | 1/2010 | Darvish et al. | |
| 2006/0012479 A1* | 1/2006 | Ezra | 340/572.1 |
| 2006/0085164 A1 | 4/2006 | Leyton et al. | |
| 2009/0099724 A1* | 4/2009 | Kranz et al. | 701/35 |
| 2009/0306997 A1* | 12/2009 | Betancourt | 705/1 |
| 2010/0073124 A1 | 3/2010 | Mahalingaiah et al. | |
| 2010/0114616 A1 | 5/2010 | Touati | |

OTHER PUBLICATIONS

E-mail notification sent by Wright Express, Jun. 3, 2010, re: Adjusted Odometer Changes (1 page).

* cited by examiner

*Primary Examiner* — James Trammell
*Assistant Examiner* — Michael D Lang
(74) *Attorney, Agent, or Firm* — Pierce Atwood LLP

(57) ABSTRACT

The invention, in one aspect, features a fuel and vehicle monitoring method. The method includes receiving, via a first processor, a first odometer value and a first fuel acquisition value for a vehicle at a first instance. The method also includes determining, with a second processor, whether the first odometer value satisfies a predetermined criterion. The method also includes forecasting a first future fuel economy value for the vehicle based on the first odometer value and the first fuel acquisition value and a plurality of previously received odometer values and fuel acquisition values if the predetermined criterion is satisfied, or the plurality of previously received odometer values and fuel acquisition values if the predetermined criterion is not satisfied.

24 Claims, 9 Drawing Sheets

| Date | Prior Odo | Current Odo | Gallons | d (Distance) | m (DPU) | Reasonable? |
|---|---|---|---|---|---|---|
| 1-Jan | 88 | 376 | 10 | 288 | 28.80 | Y |
| 6-Jan | 376 | 698 | 11 | 322 | 29.27 | Y |
| 9-Jan | 698 | 976 | 12 | 278 | 23.17 | Y |
| 11-Jan | 976 | 1259 | 10 | 283 | 28.30 | Y |
| 17-Jan | 1259 | 1529 | 9 | 270 | 30.00 | Y |
| *19-Jan* | *1529* | *2300* | *10* | *771* | *77.10* | *N* |
| *20-Jan* | *2300* | *2083* | *10* | *-217* | *-21.70* | *N* |
| 25-Jan | 2083 | 2305 | 12 | 222 | 18.50 | Y |
| *30-Jan* | *2305* | *2305* | *9* | *0* | *0.00* | *N* |
| *4-Feb* | *2305* | *2899* | *9* | *594* | *66.00* | *N* |
| 6-Feb | 2899 | 3190 | 11 | 291 | 26.45 | Y |
| 12-Feb | 3190 | 3449 | 10 | 259 | 25.90 | Y |
| 13-Feb | 3449 | 3784 | 11 | 335 | 30.45 | Y |
| 18-Feb | 3784 | 4010 | 9 | 226 | 25.11 | Y |
| 21-Feb | 4010 | 4300 | 12 | 290 | 2417 | Y |
| 23-Feb | 4300 | 4548 | 10 | 248 | 24.80 | Y |
| 28-Feb | 4548 | 4783 | 9 | 235 | 26.11 | Y |
| 3-Mar | 4783 | 5054 | 11 | 271 | 24.64 | Y |

FIG. 2

| Date | Prior Odo | Current Odo | Gallons | m (DPU) | w (Weight) | f (Forecast) |
|---|---|---|---|---|---|---|
| 1-Jan | 88 | 376 | 10 | 28.80 | 1 | 28.80 |
| 6-Jan | 376 | 698 | 11 | 29.27 | 0.66666667 | 29.12 |
| 9-Jan | 698 | 976 | 12 | 23.17 | 0.5 | 26.14 |
| 11-Jan | 976 | 1259 | 10 | 28.30 | 0.4 | 27.00 |
| 17-Jan | 1259 | 1529 | 9 | 30.00 | 0.33333333 | 28.00 |
| 25-Jan | 2083 | 2305 | 12 | 18.50 | 0.28571429 | 25.29 |
| 6-Feb | 2899 | 3190 | 11 | 26.45 | 0.25 | 25.58 |
| 12-Feb | 3190 | 3449 | 10 | 25.90 | 0.22222222 | 25.65 |
| 13-Feb | 3449 | 3784 | 11 | 30.45 | 0.2 | 26.61 |
| 18-Feb | 3784 | 4010 | 9 | 25.11 | 0.18181818 | 26.34 |
| 21-Feb | 4010 | 4300 | 12 | 24.17 | 0.16666667 | 25.98 |
| 23-Feb | 4300 | 4548 | 10 | 24.80 | 0.15384615 | 25.80 |
| 28-Feb | 4548 | 4783 | 9 | 26.11 | 0.14285714 | 25.84 |
| 3-Mar | 4783 | 5054 | 11 | 24.64 | 0.13333333 | 25.68 |

FIG. 3

| Date | PriorOdo | CurrOdo | Gallons | m(DPU) | f(Forecast) | rsd | rmse | ErrorThresh |
|---|---|---|---|---|---|---|---|---|
| 1-Jan | 88 | 376 | 10 | 28.80 | 28.80 | 0.00 | 0 | 0 |
| 6-Jan | 376 | 698 | 11 | 29.27 | 29.12 | -0.16 | 0 | 0 |
| 9-Jan | 698 | 976 | 12 | 23.17 | 26.14 | 2.97 | 2.63153 | 1.1302335 |
| 11-Jan | 976 | 1259 | 10 | 28.30 | 27.00 | -1.30 | 2.63153 | 0.49228204 |
| 17-Jan | 1259 | 1529 | 9 | 30.00 | 28.00 | -2.00 | 2.63153 | 0.75886284 |
| 25-Jan | 2083 | 2305 | 12 | 18.50 | 25.29 | 6.79 | 2.63153 | 2.57944274 |
| 6-Feb | 2899 | 3190 | 11 | 26.45 | 25.58 | -0.87 | 2.63153 | 0.33250629 |
| 12-Feb | 3190 | 3449 | 10 | 25.90 | 25.65 | -0.25 | 2.63153 | 0.09471391 |
| 13-Feb | 3449 | 3784 | 11 | 30.45 | 26.61 | -3.84 | 2.63153 | 1.46037914 |
| 18-Feb | 3784 | 4010 | 9 | 25.11 | 26.34 | 1.23 | 2.63153 | 0.46649808 |
| 21-Feb | 4010 | 4300 | 12 | 24.17 | 25.98 | 1.81 | 2.63153 | 0.68782813 |
| 23-Feb | 4300 | 4548 | 10 | 24.80 | 25.80 | 1.00 | 2.63153 | 0.37836354 |
| 28-Feb | 4548 | 4783 | 9 | 26.11 | 25.84 | -0.27 | 2.63153 | 0.10142686 |
| 3-Mar | 4783 | 5054 | 11 | 24.64 | 25.66 | 1.02 | 2.63153 | 0.38837428 |

FIG. 5

| Date | Prior Odo | Curr Odo | Gallons | m (DPU) | w (Weight) | Forecast Orig | Forecast Final |
|---|---|---|---|---|---|---|---|
| 1-Jan | 88 | 376 | 10 | 28.80 | 1 | 28.80 | 28.80 |
| 6-Jan | 376 | 698 | 11 | 29.27 | 0.66666667 | 29.12 | 29.12 |
| 9-Jan | 698 | 976 | 12 | 23.17 | 0.5 | 26.14 | 26.14 |
| 11-Jan | 976 | 1259 | 10 | 28.30 | 0.4 | 27.00 | 27.00 |
| 17-Jan | 1259 | 1529 | 9 | 30.00 | 0.33333333 | 28.00 | 28.00 |
| 25-Jan | 2083 | 2305 | 12 | 25.29 | 0.28571429 | 25.29 | 27.23 |
| 6-Feb | 2899 | 3190 | 11 | 26.45 | 0.25 | 25.58 | 27.03 |
| 12-Feb | 3190 | 3449 | 10 | 25.90 | 0.22222222 | 25.65 | 26.78 |
| 13-Feb | 3449 | 3784 | 11 | 30.45 | 0.2 | 26.61 | 27.52 |
| 18-Feb | 3784 | 4010 | 9 | 25.111 | 0.18181818 | 26.34 | 27.08 |
| 21-Feb | 4010 | 4300 | 12 | 24.17 | 0.16666667 | 25.98 | 26.59 |
| 23-Feb | 4300 | 4548 | 10 | 24.80 | 0.15384615 | 25.80 | 26.32 |
| 28-Feb | 4548 | 4783 | 9 | 26.11 | 0.14285714 | 25.84 | 26.29 |
| 3-Mar | 4783 | 5054 | 11 | 24.64 | 0.13333333 | 25.68 | 26.07 |

FIG. 7

FUEL AND VEHICLE MONITORING METHODS AND SYSTEMS

FIELD OF THE INVENTION

The present invention relates to methods and systems for fuel and vehicle monitoring.

BACKGROUND

Fleet vehicles are groups of vehicles owned or leased by a business or government agency, rather than by an individual or family. Typical examples are vehicles operated by car rental companies, taxicab companies, public utilities, and police departments. In addition, many businesses purchase or lease fleet vehicles to deliver goods or services to customers, or for sales representatives to travel to clients.

Fleet vehicle operation and performance are typically monitored to insure the vehicles and fleet are operating safely and efficiently. Although the fleet owner may have a maintenance department, the vehicles are often operated by several drivers, subjecting them to accelerated wear. In addition, drivers often do not exercise the same care for fleet vehicles as they might for their own personal vehicles. Fleet vehicles may also be subjected to unusual conditions such as 24-hour use or excessive cargo weights, and may be kept in service until they have accumulated hundreds of thousands of miles.

Various sources of information are used to monitor fleet vehicles, including, for example, fuel purchase and odometer information. Modern fuel pumps and service stations typically employ elaborate point of sale devices with sophisticated control electronics and user interfaces that have touch pads/screens and displays. The devices are used to capture data and provide the data to business owners. The data collected at the point of sale sometimes includes the amount of the expenditure, the identification of the driver and vehicle, the odometer reading, the identity of the fuel or vehicle maintenance provider and the items purchased. Companies are better able to manage their vehicle fleets and control costs based on the data collected.

A company is, however, only able to effectively manage its vehicle fleets and control costs if the data that is collected is accurate. A company may make suboptimal decisions if vehicle users enter inaccurate information. A vehicle user may enter inaccurate information through, for example, simple error or because they are using the vehicle for unapproved business purposes or using a company fuel charge and for inappropriate reasons (e.g., using a fuel card to pay for fuel for both a company vehicle and an unauthorized vehicle).

A need therefore exists for improved fuel and vehicle monitoring methods and systems.

SUMMARY

The invention, in one aspect, features a fuel and vehicle monitoring method. The method includes receiving, via a first processor, a first odometer value and a first fuel acquisition value for a vehicle at a first instance. The method also includes determining, with a second processor, whether the first odometer value satisfies a predetermined criterion. The method also includes forecasting a first future fuel economy value for the vehicle based on the first odometer value and the first fuel acquisition value and a plurality of previously received odometer values and fuel acquisition values if the predetermined criterion is satisfied, or the plurality of previously received odometer values and fuel acquisition values if the predetermined criterion is not satisfied.

In some embodiments, the first future fuel economy value for the vehicle is forecast based on a moving average of the plurality of previously received odometer values and fuel acquisition values. In some embodiments, the moving average is a weighted moving average, simple moving average, cumulative moving average, or an exponentially weighted moving average.

In some embodiments, the method includes receiving, via the first processor, a second odometer value and a second fuel acquisition value for a vehicle at a second instance. In some embodiments, the method also includes determining, with the second processor, whether the second odometer value satisfies a predetermined criterion. In some embodiments, the method includes forecasting a second future fuel economy value for the vehicle based on the second odometer value and the second fuel acquisition value, the plurality of previously received odometer values and fuel acquisition values, and the first forecast future fuel economy value if the predetermined criterion is satisfied, or the plurality of previously received odometer values and fuel acquisition values if the predetermined criterion is not satisfied.

In some embodiments, the method includes modifying the first future fuel economy value based on the second future fuel economy value and the plurality of previously received odometer values and fuel acquisition values. In some embodiments, the method includes modifying one or more odometer values based on the modified first future fuel economy value.

In some embodiments, the method includes modifying the first odometer value based on the plurality of previously received odometer values and fuel acquisition values. In some embodiments, the method includes determining when to service the vehicle based on the modified first odometer value. In some embodiments, the method includes estimating an operating cost parameter for the vehicle based on the modified first odometer value.

In some embodiments, the operating cost parameter is predicted fuel consumption or predicted service schedule for the vehicle. In some embodiments, the first odometer value satisfies the predetermined criterion when the first odometer value is determined to be greater than a lower control limit and less than an upper control limit. In some embodiments, at least one of the lower control limit and the upper control limit are modified based on the plurality of previously received odometer values and the first odometer value.

In some embodiments, a user inputs the first odometer value into a second processor at a fuel station. In some embodiments, the second processor transmits the first fuel acquisition value to the first processor, and wherein the first fuel acquisition value is an amount of fuel purchased by the user at the station at the first instance.

In some embodiments, the method includes identifying questionable action (e.g., fraudulent action, suspicious action or inaccurate action) by a user of the vehicle by comparing a second future fuel economy value to the first fuel economy value. In some embodiments, questionable action is identified if the second future fuel economy value is less than the first fuel economy value by a predetermined amount. In some embodiments, questionable action is identified if the second future fuel economy value is less than the first fuel economy value by an amount that is determined based on previous fuel forecasts and fuel acquisition values. In some embodiments, questionable action is identified if the second future fuel economy value is less than a fuel economy value typical of the vehicle's type.

In some embodiments, the method includes limiting the user's authorized activity in response to identifying the questionable action. In some embodiments, the method includes transmitting one or more future fuel economy values, odometer values or fuel acquisition values to a user. In some embodiments, the step of transmitting is based on a query by the user.

In some embodiments, the method includes modifying utilization parameters of the vehicle based on the one or more future fuel economy values, odometer values or fuel acquisition values. In some embodiments, modifying utilization parameters comprises modifying a service schedule for the vehicle or an operating region specified for the vehicle. In some embodiments, the method includes modifying estimated fuel economy statistics stored for a family of vehicles of the same type as the vehicle. In some embodiments, the method includes transmitting one or more future fuel economy values to a user for a family of vehicles of the same type as the vehicle based on the user inputting a vehicle identification number.

The invention, in another aspect, features a system for fuel and vehicle monitoring. The system includes means for receiving a first odometer value and a first fuel acquisition value for a vehicle at a first instance. The system also includes means for determining whether the first odometer value satisfies a predetermined criterion. The system also includes means for forecasting a first future fuel economy value for the vehicle based on the first odometer value and the first fuel acquisition value and a plurality of previously received odometer values and fuel acquisition values if the predetermined criterion is satisfied, or the plurality of previously received odometer values and fuel acquisition values if the predetermined criterion is not satisfied.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed description, taken with reference to the accompanying drawings.

FIG. 2 is a table illustrating exemplary results following a reasonableness check step using methods of the present invention.

FIG. 3 is a table illustrating exemplary results following the step of evaluating the odometer entry using forecasting using methods of the present invention.

FIG. 5 is a table illustrating exemplary results following the step of determining the error threshold using methods of the present invention.

FIG. 7 is a table illustrating exemplary results following the step of forecasting the fuel economy values using methods of the present invention

DETAILED DESCRIPTION OF ILLUSTRATIVE EMBODIMENTS

Figure 1:
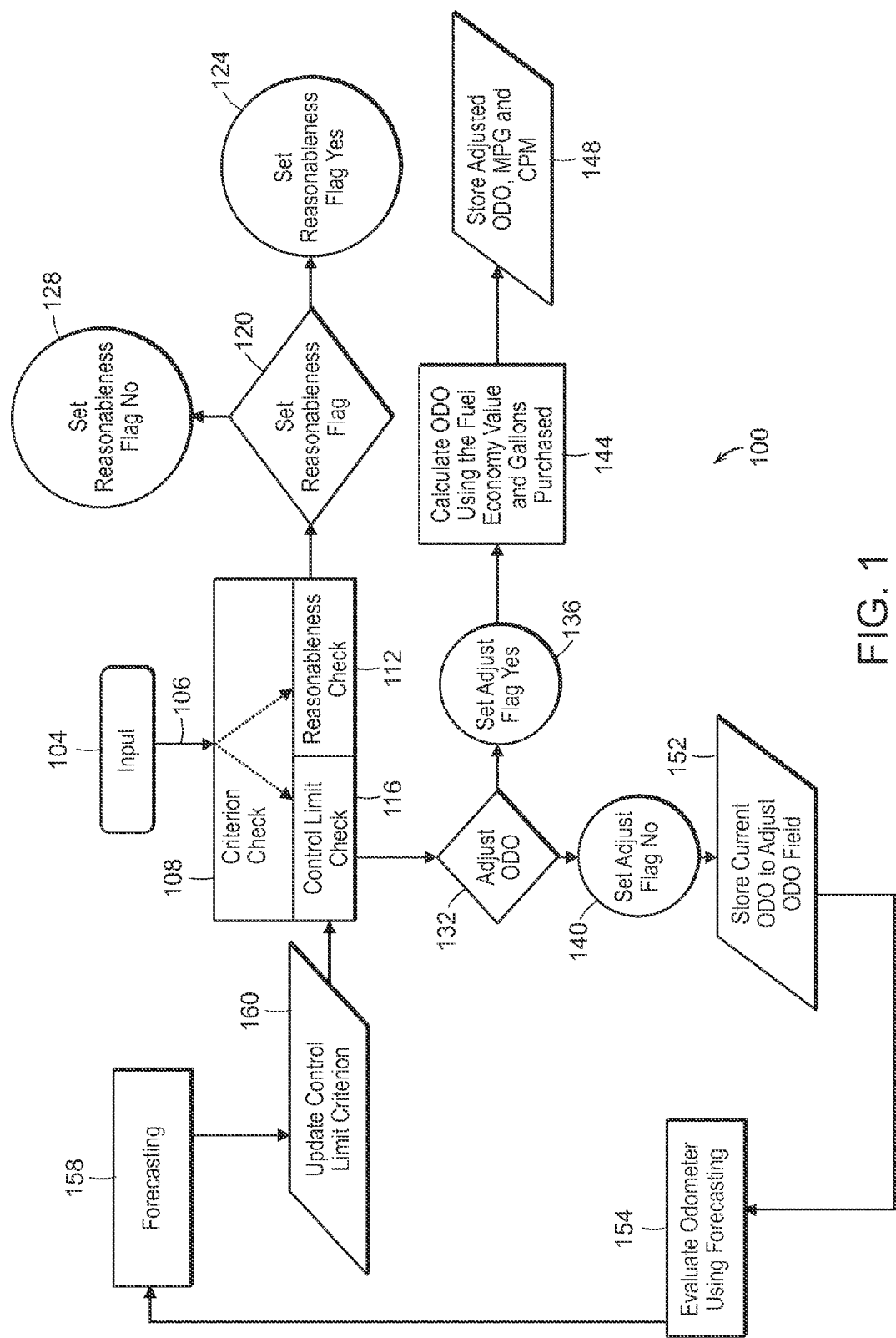
FIG. 1 illustrates a block diagram of a fuel and vehicle monitoring method, according to an illustrative embodiment of the invention.

FIG. 1 illustrates a block diagram of a fuel and vehicle monitoring method 100, according to an illustrative embodiment of the invention. The method 100 includes inputting/entering 104 one or more fuel and/or vehicle parameters. In one embodiment, a user (e.g., vehicle operator) inputs the data 106 (step 104) into a processor via a keypad at a service station fuel pump. Various types of parameters may be input in different embodiments of the invention. In one embodiment, the user inputs the odometer value of the vehicle read from the vehicle odometer inside the vehicle. In this embodiment, the quantity of fuel purchased by the user also is input. The quantity of fuel may, for example, be input automatically by a processor in the fuel pump because the fuel pump processor measures this data in the ordinary course of providing the fuel to the user.

The processor at the service station fuel pump, or a different processor at a remote location, determines whether the odometer value satisfies one or more predetermined criterion (step 108). In this embodiment, the processor performs two criterion checks. The criterion checks are a reasonableness check step 112 and a control limit check step 116.

The reasonableness check step 112 determines whether the data 106 should be included in subsequent calculations (e.g., forecast calculations). The method also includes setting a reasonableness flag (120) based on the output of the reasonableness check step 112. The reasonableness flag is set to a value corresponding to "Yes" (step 124) if the reasonableness check step 112 determines the data 106 satisfies a predetermined criterion. The reasonableness flag is set to a value corresponding to "No" (step 128) if the reasonableness check step 112 determines the data 106 does not satisfy the predetermined criterion.

In one embodiment, the reasonableness check step 112 analyzes 1) the distance traveled by the vehicle since data 106 was last input by the user and 2) a calculated fuel economy value (i.e., distance per unit of fuel) for the vehicle. The reasonableness flag is set to a value corresponding to "No" (step 128) if 1) the distance traveled is less than a first predetermined value or greater than a second predetermined value or 2) the fuel economy value is less than a first predetermined value or greater than a second predetermined value.

In one embodiment, the first predetermined distance value was set 10 miles (16.1 kilometers) and the second predetermined distance value was set to 2000 miles (3380.6 kilometers). In one embodiment, the first predetermined fuel economy value was set to 0 miles per gallon (0 kilometers per liter) and the second predetermined fuel economy value was set to 60 miles per gallon miles (25.5 kilometers per liter). If the processor determines the transaction entry is not reasonable, then the transaction data (data 106) is not included in the subsequent forecast calculations. FIG. 2 is a table illustrating the results of applying this embodiment of the reasonableness check step 112 to a set of data. The rows for dates 19-January, 20-January, 30-January and 4-February are determined to not be reasonable and would not be included in the subsequent forecast analysis.

In some embodiments, alternative parameters and values are used in the reasonableness check step 112. In some embodiments, the values (e.g., fuel economy values) are based on a predetermined value associated with the specific type of vehicle that is being fueled. For example, for vehicles that normally operate in a highly efficient manner, the range of fuel economy values would be higher than for vehicles that do not operate in a highly efficient manner. In some embodiments, the values are stored in a data storage device and referenced, as necessary, as a user accesses the system for a particular vehicle type or a particular vehicle (e.g., if a user is, for example, associated with a particular vehicle identification number (VIN)).

The control limit check step 116 determines whether the data 106 should be used to adjust the odometer (ODO) value stored by the processor. The method also includes setting an adjust flag (132) based on the output of the control limit check step 116. The adjust flag is set to a value corresponding to "Yes" (step 136) if the control limit check step 132 determines the data 106 satisfies a predetermined criterion. The adjust flag is set to a value corresponding to "No" (step 140) if the control limit check step 132 determines the data 106 does not satisfy the predetermined criterion.

In this embodiment, the control limit check step 116 involves determining if a new, calculated fuel economy value (e.g., one based on a currently entered odometer value and current fuel acquisition value) falls within or outside a predetermined range. The predetermined range is specified by an upper control limit (ucl) and lower control limit (lcl). If the new, calculated fuel economy value is within the range specified by the upper control limit and the lower control limit, the adjust flag is set to "No" (step 140). If the new, calculated fuel economy value is not within the range specified by the upper control limit and the lower control limit, the adjust flag is set to "Yes" (step 136). In one embodiment, the control limits are based on the following:

$$stddev = \sqrt{\frac{\sum (m - \overline{m})^2}{n}} \qquad \text{EQN. 8}$$

where $\overline{m}$ is the average fuel economy value based on a plurality of previous fuel economy values stored in the system, and the upper control limit ($ucl_c$) and lower control limit ($lcl_c$) are determine based on:

$$ucl_c = f_c + (3 \cdot stddev) \qquad \text{EQN. 9}$$

$$lcl_c = f_c - (3 \cdot stddev) \qquad \text{EQN. 10}$$

Where $f_c$ is the currently forecast fuel economy value.

The upper and lower control limits can be set based on alternative relationships that provide a range (e.g., based on a statistical evaluation of the data) of allowable fuel economy values. In some embodiments, the control limits are determined based on an estimated normal distribution centered on $f_c$ or a non-normal distribution (e.g., a log-normal distribution). The type of distribution that is selected can be a function of which distribution best represents the historical data (e.g., previously acquired or estimated fuel economy values).

If the adjust flag is set to the value corresponding to "Yes" (step 136), the method 100 then involves calculating an adjusted odometer value based on the previously forecast fuel economy value and the quantity of fuel purchased by the user from the data 106 from the current transaction (input in step 104). The data 106 and calculated values (e.g., calculated odometer value) are then stored by the processor (step 148) in, for example, a data table or database system that is stored in a storage device associated with the processor. The stored data can then be used, for example, for various real-time and post processing purposes.

If the adjust flag is set to the value corresponding to "No" (step 140), the method 100 then involves storing, with the processor, the current odometer value of the data 106 to a data field (e.g., Adjust Odometer Field) that is designated for adjusting the odometer (step 151) in, the table or database system (similarly as described herein).

The method 100 includes evaluating the current odometer value using one or more numerical processing methods (step 154). In this embodiment, step 158 involves forecasting a fuel economy value based on the current odometer value and fuel acquisition value (data 106) and a plurality of previously received odometer values and fuel acquisition values (e.g., that are stored, for example, in the processor). In one embodiment, the fuel economy value is forecast based on an exponentially weighted moving average of the current odometer value and fuel acquisition value (data 106) and a plurality of previously received and stored odometer values and fuel acquisition values. The exponentially weighted moving average is done by applying a weight to the current data (data 106) and adding that to the combination of (1-weight) applied to the prior forecasted value. In this embodiment, the exponentially weighted moving average is calculated based on the following relationships:

$$w = \frac{2}{n+1} \qquad \text{EQN. 1}$$

$$f_c = w \cdot m_c + (1-w) \cdot (f_p) \qquad \text{EQN. 2}$$

where w is the weighting value, n is the number of data points used for calculations, $m_c$ is the current fuel economy value (distance per unit of fuel), $f_p$ is the prior forecasted fuel economy, and $f_c$ is the current forecasted fuel economy.

The exponentially weighted moving average is done to provide a dynamic weight to more recent values as compared to the weight applied to older values (i.e., previously received and/or stored values). In this manner, the method may be tuned by adjusting the weight calculation. The weighting value (w) is used to provide more or less weight to the more recent fuel economy values when calculating the current forecasted fuel economy value ($f_c$).

Figure 4:
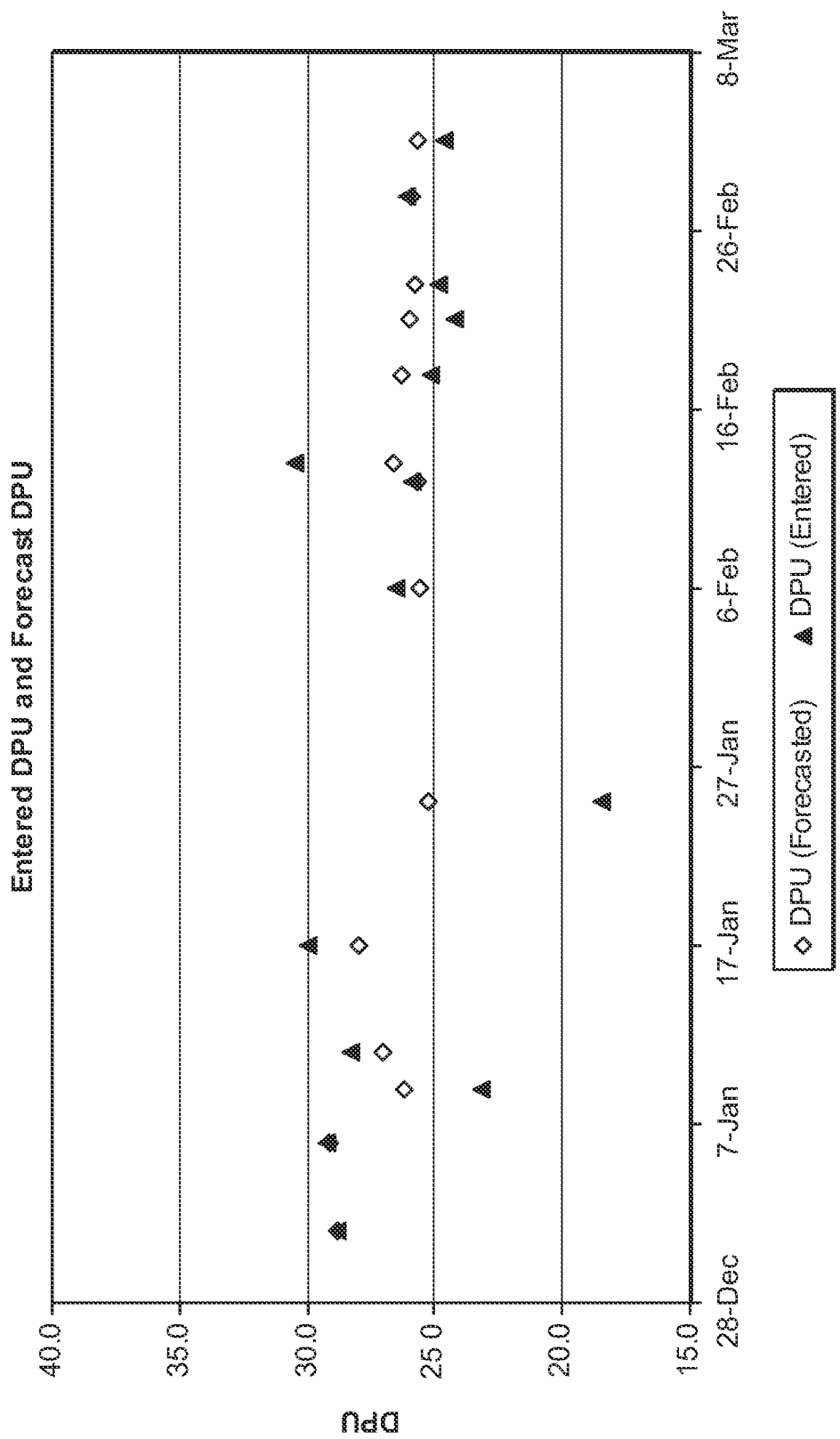
FIG. 4 is a graphical representation of a plot of fuel economy values versus transaction entry date from the table in FIG. 3.

FIG. 3 is a table illustrating exemplary results following the step of evaluating the odometer entry using forecasting using methods (step 154) of the present invention on the data from the table in FIG. 2. FIG. 4 is a lot of fuel economy values versus transaction entry date from the table in FIG. 3. The forecasted fuel economy (DPU) and the fuel economy calculated based on the user entry are plotted.

Alternative forecasting methods can be employed in alternative embodiments of the invention. In some embodiments, the forecasting method is instead, for example, a moving average, weighted moving average, simple moving average, or cumulative moving average.

The forecasting method (step 158) also includes performing an error threshold calculation. In this embodiment, the error threshold calculation involves taking the root mean square error of the residual differences between the forecasted values and the entered values. The entered odometer value may be replaced with the forecasted value based on the results of these calculations. The error threshold calculation is performed based on:

$$rsdl = m_c - f_c \qquad \text{EQN. 3}$$

$$rmse = \sqrt{\frac{\sum (rsdl)^2}{|n-2|}} \qquad \text{EQN. 4}$$

where rsdl is the residual difference, and rmse is the root mean square error of the residual differences between the forecasted values and the entered values.

The calculations are performed to remove outlier data (e.g., data entered at different times by the user that may not be very accurate) to make the final forecasted data (e.g., future fuel economy values) more accurate. The data may have passed the original reasonableness check (step 112), but, are nonetheless less accurate. In one embodiment, the odometer values and fuel economy values stored by the system are updated if the values do not satisfy one or more predetermined criterion. In one example, the odometer and fuel economy values are adjusted if:

$$\text{abs}\left(\frac{rsdl}{rmse}\right) > 2 \qquad \text{EQN. 5}$$

where the odometer value is adjusted based on $$d = f_c \times u \qquad \text{EQN. 6}$$

and the fuel economy value is adjusted based on $$m = f_c \qquad \text{EQN. 7}$$

where d is the new, adjusted odometer value, u is the number of units of fuel purchased, and m is the new adjusted fuel economy value.

The odometer and fuel economy values are not adjusted if EQN. 5 is not satisfied. In this manner, when the residual difference value (between forecast and entered odometer) is greater than two times the root mean squared error, the calculated fuel economy value will be "smoothed" by replacing the calculated fuel economy value (which was based on the entered odometer) with the forecasted value. When the forecast value is calculated again (in the next step) using the smoothed data, the forecasts will be more stable.

Figure 6:
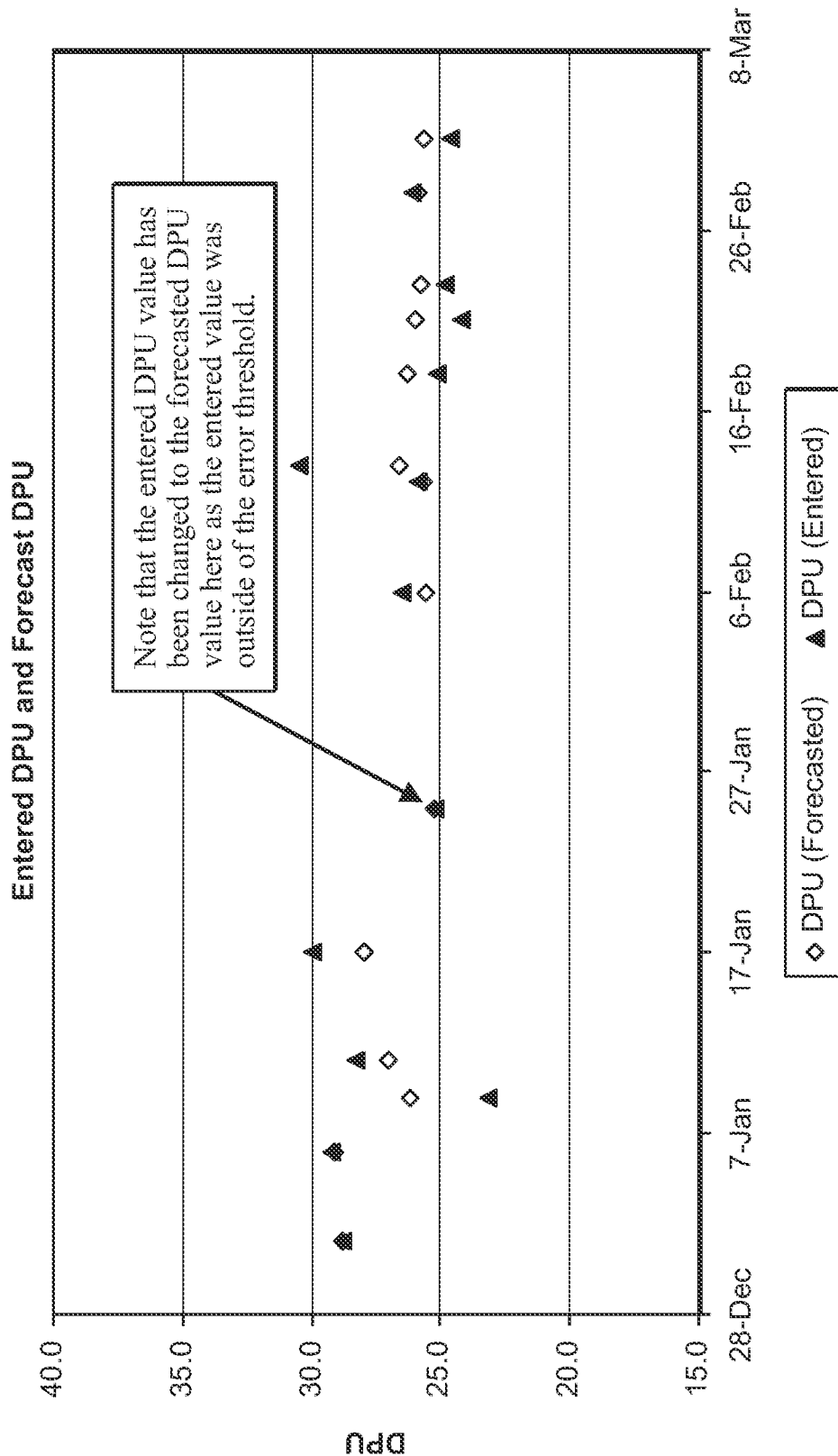
FIG. 6 is a graphical representation of a plot of fuel economy versus transaction date based on the data in FIG. 5.
Figure 8:
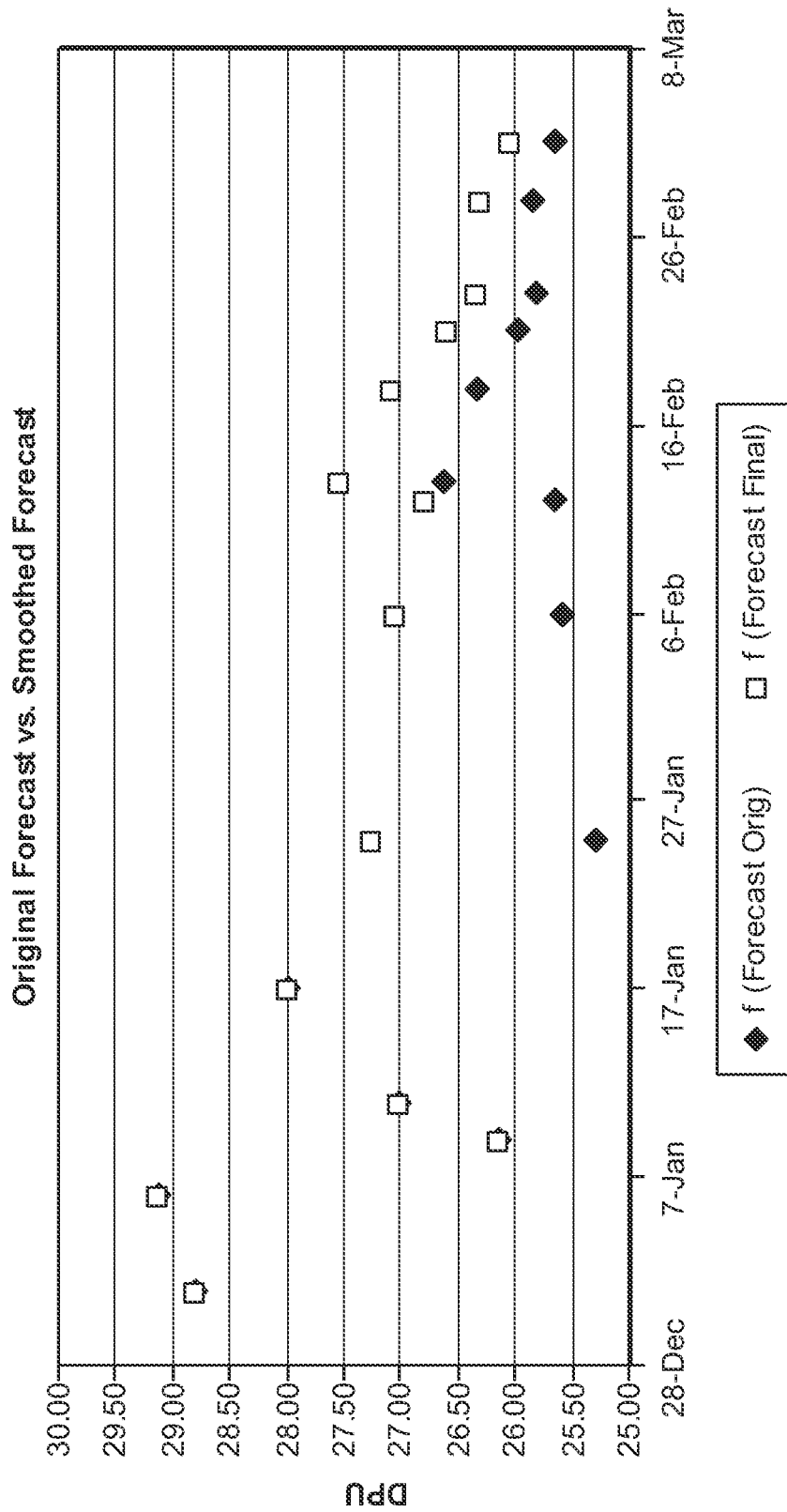
FIG. 8 is a graphical representation of a plot of fuel economy versus transaction date based on the data in FIG. 7.

FIG. 5 is a table illustrating exemplary results following the step of determining the error threshold using methods of the present invention. The calculated values for rsdl (EQN. 3), rmse (EQN. 4), and the error threshold (EQN. 5) are listed in the table. FIG. 6 is a graphical representation of a plot of fuel economy versus transaction date based on the data in FIG. 5. When the residual difference (between forecast and entered odometer) value is greater than two times the root mean squared error (EQN. 5), the DPU value will be "smoothed" by replacing the calculated DPU value (which was based on the entered odometer) with the forecasted value. Then when the forecast value is calculated again (in the next step) using the smoothed data, the forecasts will be more stable (as illustrated in FIG. 8).

Alternative criterion can be used for the reasonableness check (step 112) in other embodiments of the invention. For example, in some embodiments, the odometer and fuel economy values are adjusted if the calculation on the left side of the equation is greater than an alternative value. In some embodiments, rmse is replaced by the means square error (mse) or some alternative quantity that is a measure of the difference between an estimate of a value and the true value of the quantity being estimated.

A forecasting method (step 158) is repeated (using EQNS. 1 and 2) an additional time to generate a final forecasted fuel economy value. Because the above steps are performed on the historical data as well as the currently entered data, the forecasting performed produces updated, forecasted fuel economy values for each transaction entry. In this manner, a user is provided with more accurate estimated fuel economy forecasts as more transactions are entered over time. The final forecast calculations will be performed.

FIG. 7 is a table illustrating exemplary results following the step of forecasting the fuel economy values using methods (step 158) of the present invention. FIG. 8 is a graphical representation of a plot of fuel economy versus transaction date based on the data in FIG. 7. Note that the 25-January original DPU data value (18.50) has been replaced with the forecasted value for that date (25.29).

The method also includes updating the control limit criterion (step 160) used in the criterion check step (step 108). In one embodiment, the control limits are based on the following:

$$stddev = \sqrt{\frac{\sum (m - \overline{m})^2}{n}} \qquad \text{EQN. 8}$$

where $\overline{m}$ is the average fuel economy value determined from the "n" data points, and the upper control limit ($ucl_c$) and lower control limit ($lcl_c$) are determined based on:

$$ucl_c = f_c + (3 \cdot stddev) \qquad \text{EQN. 9}$$

$$lcl_c = f_c - (3 \cdot stddev) \qquad \text{EQN. 10}$$

The upper and lower control limits can be set based on alternative relationships that provide a range (e.g., based on a statistical evaluation of the data) of allowable fuel economy values. In some embodiments, the upper and lower control limits are based on a lower multiplier or greater multiplier of stddev.

Based on the forecasted fuel economy value, lower control limit, and upper control limit, future transaction entries (e.g., fueling entries) by a user will be evaluated. If future entries (e.g., odometer value entries performed in the input step 104 for future fuel transactions) result in a calculated fuel economy value that falls outside the range specified by the upper control limit and lower control limit, then the adjusted odometer value entered for a future transaction will be based on the previously forecast fuel economy value and the actual fuel acquisition value of the current transaction (e.g., liters of fuel purchased during the current transaction), instead of the odometer value entered by the user and the actual fuel acquisition value. The steps of method 100 of FIG. 1 are performed again for subsequent transactions (i.e., future fuel purchases) conducted by the user.

Figure 9:
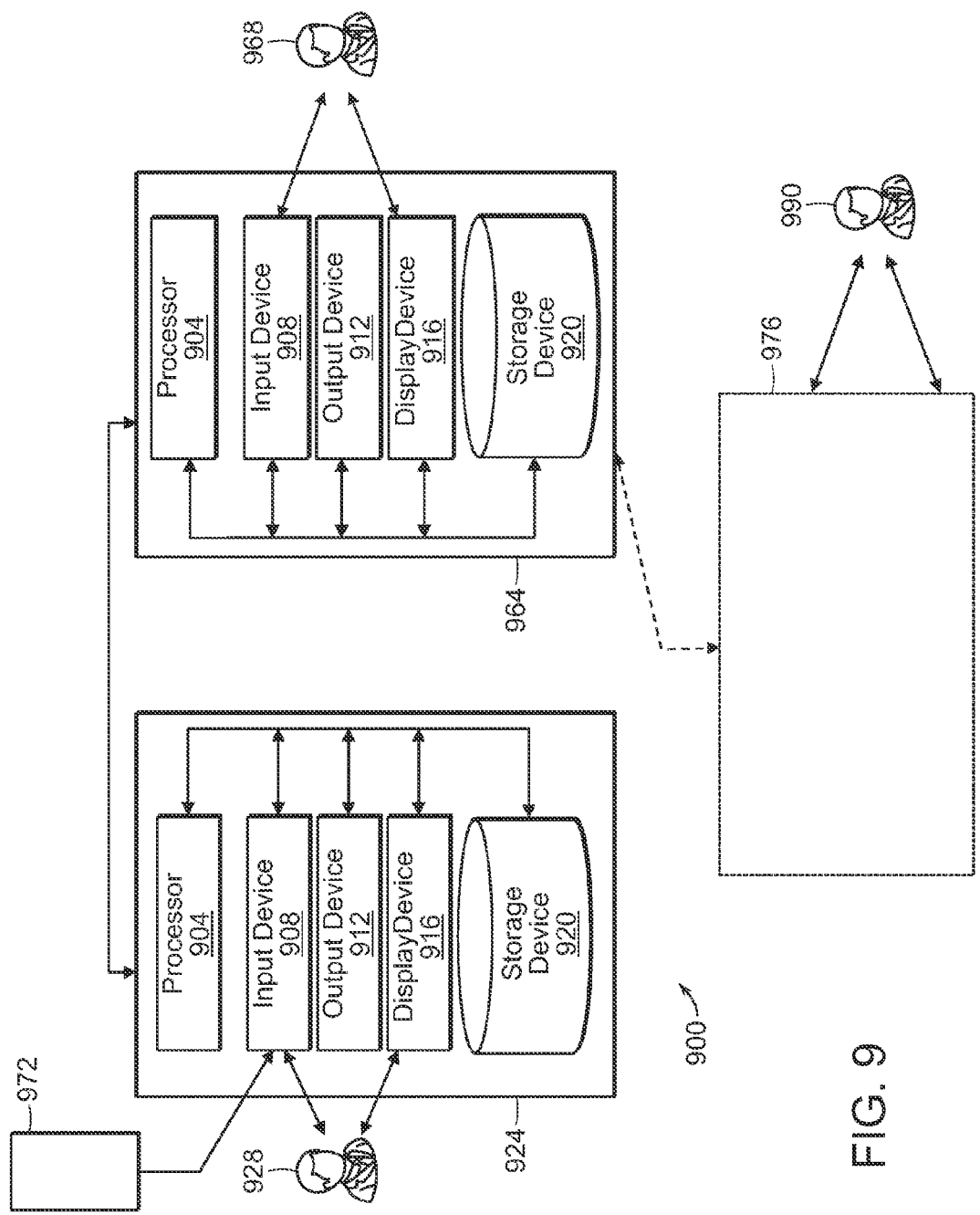
FIG. 9 is a schematic illustration of a system for fuel and vehicle monitoring, according to an illustrative embodiment of the invention.

FIG. 9 is a schematic illustration of a system 900 for fuel and vehicle monitoring, according to an illustrative embodiment of the invention. In this embodiment, the system 900 includes a first computing device 924. The computing device 924 includes a processor 904, input device 908, output device 912, display device 916, and storage device 920. A user 928 interacts with the computing device 924. In this embodiment, the user 928 is an operator of a vehicle and is located at a service station (not shown) for purposes of fueling the vehicle. The computing device 924 is integrated into a fuel pump 972 at the service station.

The user 928 enters authorization information into the fuel pump via the input device 908. The input device 908 receives information associated with the system 900 from the user 928 and/or another computing system (not shown). The information may include, for example, data provided by a user (e.g., odometer values, personal identification number (PIN), data provided by another computing device (e.g., vehicle identification number (VIN) stored in a data storage device associated with one or more of the processors in the system, or data provided by the fuel pump (e.g., quantity of fuel purchased).

In one embodiment, the user 928 uses the input device 908 to perform step 104 of FIG. 1 to input the vehicle odometer value, and the fuel pump 972 uses the input device 908 to input the quantity of fuel purchased by the user 928. The input device 908 can include, for example, a keyboard or a scanner for data entry (e.g., input of data (e.g., step 104 of FIG. 1). The display device 916 displays information associated with the system 900 (e.g., fuel acquisition information or values, indication that further action (e.g., fueling) may or may not proceed)).

The output device 912 outputs information associated with the system 900 (e.g., information to a printer (not shown), information to an audio speaker (not shown)). The processor 904 executes the operating system and/or any other computer executable instructions for the system 900 (e.g., sends signals to a second processor or computer system or receives response signals a second processor).

The storage device 920 stores the various information associated with the system 900 and its operation. The storage device 920 can include a plurality of storage devices. The storage device 920 can include, for example, long-term storage (e.g., a hard drive, a tape storage device, flash memory, etc.), short-term storage (e.g., a random access memory, a graphics memory, etc.), and/or any other type of computer readable storage.

The modules and devices described herein can, for example, utilize the processors (e.g., processor 904) to execute computer executable instructions and/or include a processor to execute computer executable instructions (e.g., an encryption processing unit, a field programmable gate array processing unit, etc.). It should be understood that the system 900 can include, for example, other modules, devices, and/or processors known in the art and/or varieties of the illustrated modules, devices, and/or processors.

In some embodiments, the processor 904 of the second computing device 964 determines whether the user is performing a questionable action based on the data entered (e.g., data 106 of FIG. 1). In some embodiments, the processor 904 receives a second set of data (data 106) from a second transaction and identifies questionable action (e.g., fraudulent action, suspicious action or inaccurate action) by the user of a vehicle by comparing a second fuel economy value (e.g., based on entered data) to a previous fuel economy value (e.g., previously forecasted fuel economy value).

In some embodiments, questionable action is identified if, the second future fuel economy value is less than the first fuel economy value by a predetermined amount. In some embodiments, questionable action is identified if the second future fuel economy value is less than a fuel economy value typical of the vehicle's type. The vehicle type for a user may be stored, for example, in the storage device 220 and accessed when a transaction is performed by a user. In some embodiments, the method includes limiting the user's authorized activity in response to identifying the questionable action.

In this embodiment, the data input (e.g., step 104 of FIG. 1) to the computing device 924 is transmitted to a second computing device 964. The processor 904 of the second computing device 964 performs the steps of method 100 of FIG. 1. In some embodiments, the second computing device 964 automatically performs the steps of method 100. In some embodiments, a user 968 is able to monitor the operation of the second computing device 964 and/or affect the steps performed by the second computing device 964.

In one embodiment, the second computing device 964 is operated by a credit card company that has issued a fuel charge card to the user 928. The second computing device 964 analyzes the data input by the user 928 to determine whether to, for example, authorize the user 928 to purchase fuel at the fuel pump 972. The second computing device 964 can, for example, authorize the user 928 to purchase fuel if the odometer value entered by the user results in a "Yes" being set as a result of the reasonableness check step 112 being performed. In some embodiments, the second computing device 964 can, for example, authorize the user 928 to purchase fuel if a security code/pin entered by the user 928 during step 104 of FIG. 1 matches a code/PIN stored in the storage device 920 of the second computing device 964.

In some embodiments, the system 900 includes a third computing device 976 that includes the same types of hardware and software as is included in the second computing device 964. The third computing device 976 may, for example, be operated by a customer of the credit card company and used to monitor and/or manage activities and use of the customer's fleet of vehicles.

In some embodiments, the third computing device 976 (or alternatively the second computing device 964) determines when to service the vehicle based on a modified first odometer value that is determining using the method 100 of FIG. 1 (e.g., rather than odometer values entered by the user during step 104 of FIG. 1). In some embodiments, one of the processors in the system estimates an operating cost parameter (e.g., cost of fuel, maintenance, and service of the vehicle over a period of time) for the vehicle based on the modified first odometer value (e.g., rather than the values entered by the user). The operating cost parameter can be, for example, predicted fuel consumption or predicted service schedule for the vehicle.

In some embodiments, the processor 204 of the second processing device 264 transmits one or more future fuel economy values, odometer values or fuel acquisition values to a user (e.g., user 990 of the third computing device 964). In some embodiments, the step of transmitting is based on a query by the user. In some embodiments, the method 100 of FIG. 1 as implemented by the system 200 of FIG. 9 also includes the step of modifying utilization parameters of the vehicle based on the one or more future fuel economy values, odometer values or fuel acquisition values. The utilization parameters can be stored, for example, in the storage device 220 of the second computing device or a storage device associated with the third computing device 276. In some embodiments, modifying utilization parameters comprises modifying a service schedule for the vehicle or an operating region specified for the vehicle. In some embodiments, the methods of the invention include modifying estimated fuel economy statistics stored for a family of vehicles of the same type as the vehicle. In some embodiments, methods of the invention includes transmitting one or more future fuel economy values to a user for a family of vehicles of the same type as the vehicle based on the user inputting a vehicle identification number.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A fuel and vehicle monitoring method, comprising:
receiving, via a first processor, a first odometer value and a first fuel acquisition value for a vehicle at a first instance;
determining, with a second processor, whether the first odometer value satisfies a predetermined criterion;
forecasting a first future fuel economy value for the vehicle based on:
the first odometer value and the first fuel acquisition value and a plurality of previously received odometer values and fuel acquisition values if the predetermined criterion is satisfied, or
the plurality of previously received odometer values and fuel acquisition values if the predetermined criterion is not satisfied;
identifying questionable action by a user of the vehicle by comparing a second future fuel economy value to the first fuel economy value; and limiting the user's authorized activity in response to identifying the questionable action.

2. The method of claim 1, wherein the first future fuel economy value for the vehicle is forecast based on a moving average of the plurality of previously received odometer values and fuel acquisition values.

3. The method of claim 2, wherein the moving average is a weighted moving average, simple moving average, cumulative moving average, or an exponentially weighted moving average.

4. The method of claim 1, further comprising:
receiving, via the first processor, a second odometer value and a second fuel acquisition value for a vehicle at a second instance;
determining, with the second processor, whether the second odometer value satisfies a predetermined criterion; and
forecasting the second future fuel economy value for the vehicle based on:
the second odometer value and the second fuel acquisition value, the plurality of previously received odometer values and fuel acquisition values, and the first forecast future fuel economy value if the predetermined criterion is satisfied, or
the plurality of previously received odometer values and fuel acquisition values if the predetermined criteria is not satisfied.

5. The method of claim 4, comprising modifying the first future fuel economy value based on the second future fuel economy value and the plurality of previously received odometer values and fuel acquisition values.

6. The method of claim 5, comprising modifying one or more odometer values based on the modified first future fuel economy value.

7. The method of claim 1, comprising modifying the first odometer value based on the plurality of previously received odometer values and fuel acquisition values.

8. The method of claim 7, comprising determining when to service the vehicle based on the modified first odometer value.

9. The method of claim 7, comprising estimating an operating cost parameter for the vehicle based on the modified first odometer value.

10. The method of claim 9, wherein the operating cost parameter is predicted fuel consumption or predicted service schedule for the vehicle.

11. The method of claim 1, wherein the first odometer value satisfies the predetermined criterion when the first odometer value is determined to be greater than a lower control limit and less than an upper control limit.

12. The method of claim 11, wherein at least one of the lower control limit and the upper control limit are modified based on the plurality of previously received odometer values and the first odometer value.

13. The method of claim 1, wherein a user inputs the first odometer value into a second processor at a fuel station.

14. The method of claim 13, wherein the second processor transmits the first fuel acquisition value to the first processor, and wherein the first fuel acquisition value is an amount of fuel purchased by the user at the station at the first instance.

15. The method of claim 1, wherein questionable action is identified if the second future fuel economy value is less than the first fuel economy value by a predetermined amount.

16. The method of claim 1, wherein questionable action is identified if the second future fuel economy value is less than a fuel economy value typical of the vehicle's type.

17. The method of claim 1, wherein the questionable action is fraudulent action, suspicious action or inaccurate action.

18. The method of claim 1, comprising transmitting one or more future fuel economy values, odometer values or fuel acquisition values to a user.

19. The method of claim 18, wherein the step of transmitting is based on a query by the user.

20. The method of claim 18, comprising modifying utilization parameters of the vehicle based on the one or more future fuel economy values, odometer values or fuel acquisition values.

21. The method of claim 20, wherein modifying utilization parameters comprises modifying a service schedule for the vehicle or an operating region specified for the vehicle.

22. The method of claim 18, comprising modifying estimated fuel economy statistics stored for a family of vehicles of the same type as the vehicle.

23. The method of claim 1, comprising transmitting one or more future fuel economy values to a user for a family of vehicles of the same type as the vehicle based on the user inputting a vehicle identification number.

24. A system for fuel and vehicle monitoring, comprising:
means for receiving a first odometer value and a first fuel acquisition value for a vehicle at a first instance;
means for determining whether the first odometer value satisfies a predetermined criterion;
means for forecasting a first future fuel economy value for the vehicle based on:
the first odometer value and the first fuel acquisition value and a plurality of previously received odometer values and fuel acquisition values if the predetermined criterion is satisfied, or
the plurality of previously received odometer values and fuel acquisition values if the predetermined criterion is not satisfied;
means for identifying questionable action by a user of the vehicle by comparing a second future fuel economy value to the first fuel economy value; and
limiting the user's authorized activity in response to identifying the questionable action.

* * * * *